Jan. 6, 1925. 1,521,913
L. R. STOWE
AUTOMATIC STOKER
Original Filed Sept. 24, 1919  6 Sheets-Sheet 5

Inventor:
Loyd R. Stowe

Patented Jan. 6, 1925.

1,521,913

UNITED STATES PATENT OFFICE.

LOYD R. STOWE, OF ST. LOUIS, MISSOURI.

AUTOMATIC STOKER.

Application filed September 24, 1919, Serial No. 325,907. Renewed August 23, 1924.

*To all whom it may concern:*

Be it known that I, LOYD R. STOWE, a citizen of the United States, residing at 5611 Enright Avenue, St. Louis, in the State of Missouri, have invented certain new and useful Improvements in Automatic Stokers, of which the following is a specification.

This invention relates to automatic stokers for boiler furnaces, and the like, and its purpose is to provide an improved arrangement of apparatus adapted to produce a more efficient, uniform and economical burning of the fuel.

In the present invention, a series of movable chain grate elements are combined with a series of grate bars, the chains and bars being arranged alternately across the grate, means being provided for operating the chains to agitate and control the movements of the fuel so that the defects of the usual chain grate and grate bar stokers are overcome. The ordinary chain grate has the disadvantage that, while it produces a positive and uniform feed of the fuel, it causes the fuel to burn thin adjacent the discharge end of the grate, thereby permitting an excessive flow of air through the fuel bed. The usual grate bar stokers permit the formation of clinkers and the caking of the fuel on the fuel bed, and they do not produce a positive or uniform feed of the fuel toward the discharge end of the grate. In the present invention, the chains are actuated to rise above or fall below the stationary grate bars, so that the movements of the fuel can be regulated as desired in different parts of the fuel bed to prevent the formation of cakes or clinkers and also to effect a building up of the fuel bed adjacent the bridge-wall, so that any desired thickness of the fuel bed may be maintained in different parts of the grate.

A further feature of the invention is that it embodies means whereby the width of the grate may be increased to any desired extent without interfering with its efficient operation in feeding the fuel. A further object of the invention is to provide means for preventing the escape of the forced draft from the chamber beneath the grate, except through the grate bars. The foregoing advantage is brought about in part by the provision of an improved air seal which prevents the escape of air through the lower stretches of the grate chains adjacent the discharge end of the grate. A further object of the invention is to provide novel means for actuating the grate chains in order to effect a reciprocating movement thereof in a substantially vertical direction, and this improvement is provided with means for permitting manual regulation of the actuation of the chains in order to permit any desired degree of agitation or retardation of the fuel in any selected portion of the area of the grate. Other objects relate to various features of construction and arrangement which will appear more fully hereinafter.

The nature of the invention will be understood from the following specification, taken with the accompanying drawings, in which one embodiment is illustrated.

In the drawings—

Fig. 3 shows a longitudinal sectional view on the line 3—3 of Fig. 2, the upper runs of the chain links being omitted for clearness;

Fig. 6ª is a plan view of a portion of one of the grate chains showing a pair of central links and an overlapping outer link;

Fig. 6ᵇ is a side elevation of the same;

The stoker is supported on a foundation 15 of concrete, or the like, which is formed in two steps comprising an upper part 15ª and a lower part 15ᵇ. The central part of the foundation is provided with a depression which forms an air chamber 16, and compressed air is supplied to this chamber through a conduit 17 having a controlling valve 18 mounted therein. A fire-brick bridge-wall 19 extends vertically a short distance from the lower end of the grate, which is designated generally by the numeral 20, and the space between the rear end of the foundation 15 and the bridge-wall constitutes an ash pit 21. A fire-arch 22 of fire-brick is mounted above the grate 20 at the forward part thereof, leaving an outlet flue 23 between the rear end of the fire-arch and the adjacent brick wall. At the forward end of the fire-arch, a fire-brick partition member 24 extends transversely of the furnace a short distance above the upper surface of the grate, and this partition member is provided with a metallic lining 25 which forms the rear wall of a fuel hopper 26. The wall 25 and the forward inclined wall 27 of the hopper are spaced apart at their lower ends to form an outlet 28 through which the fuel passes onto the upper end of the grate.

The side walls of the hopper 26 are formed by the forward side plates or walls 30$^a$ of the side frames 30 of the stoker. These side frames are formed preferably in three parts, 30$^a$, 30$^b$ and 30$^c$, which parts are connected together to form rigid supporting frame members, the parts 30$^a$ being mounted upon the forward portions 15$^a$ of the foundation, while the parts 30$^c$ are seated upon the rear ends of the parts 15$^b$ of the foundation with the rear ends thereof extending over the ash pit 21. The space from the upper edge of the inclined wall 27 to the foundation 15 is closed by the sheet metal end wall 31 which closes in the stoker mechanism and prevents the escape of air from the compressed air chamber 16.

Figure 5:
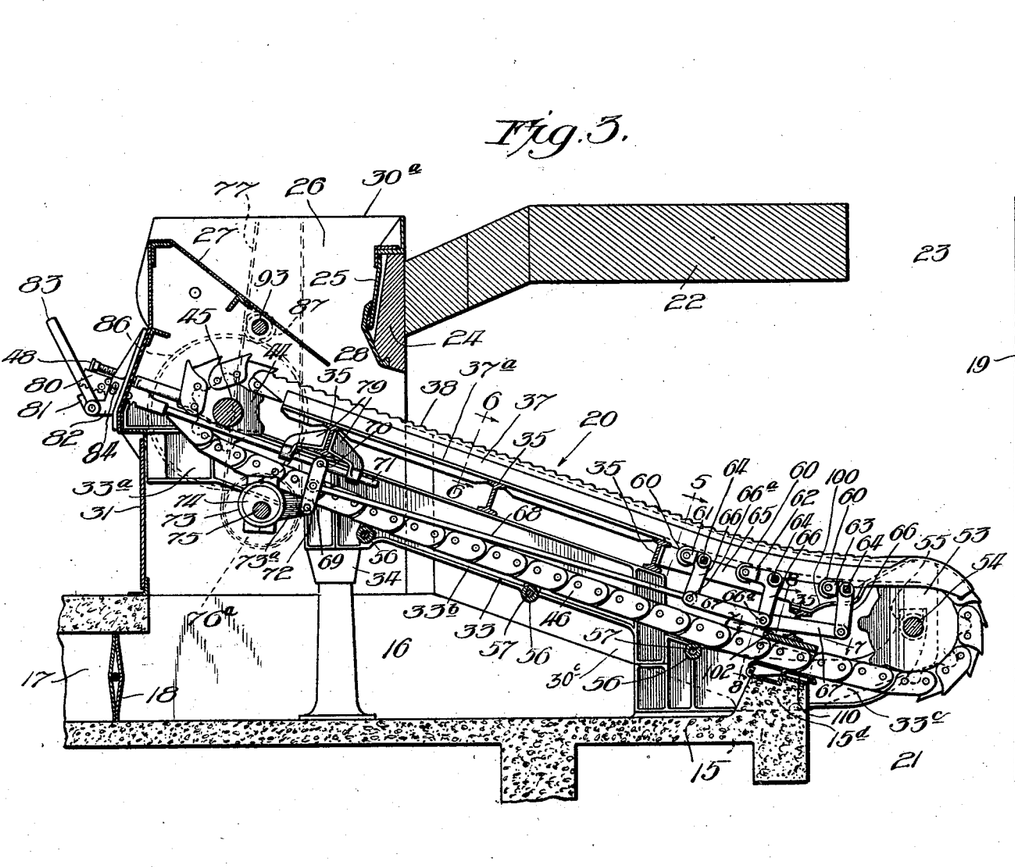
Fig. 5 shows a transverse sectional view along the line 5—5 of Fig. 3.
Figure 6:
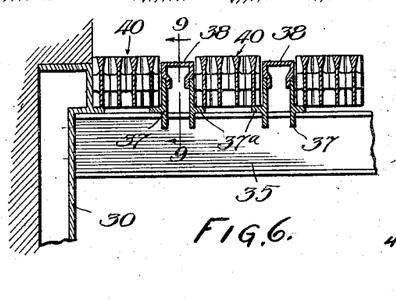
Fig. 6 shows a partial transverse sectional view on the line 6—6 of Fig. 3.
Figures 6A, 6B:
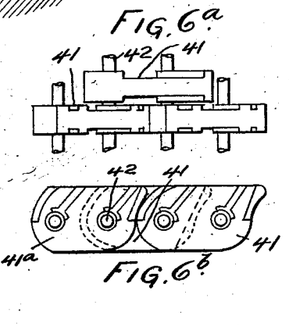
Figure 7:
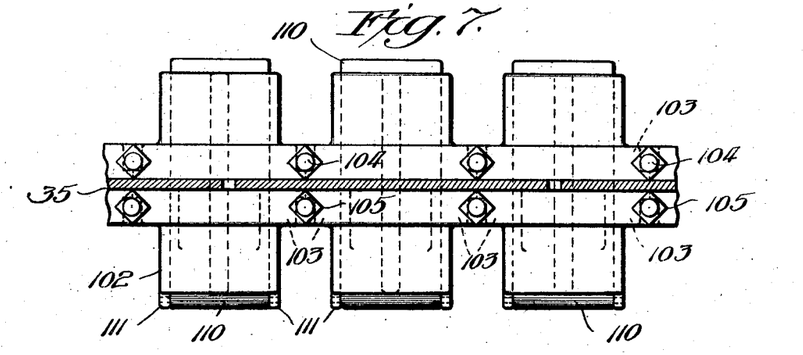
Fig. 7 shows a horizontal sectional view on the line 7—7 of Fig. 3.
Figure 9:
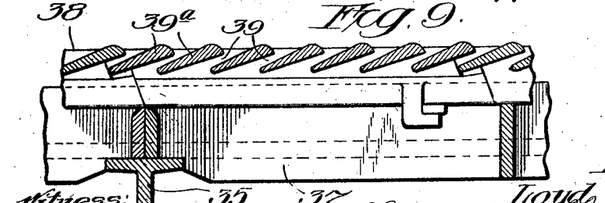
Fig. 9 shows a longitudinal sectional view on the line 9—9 of Fig. 6.
Figure 10:
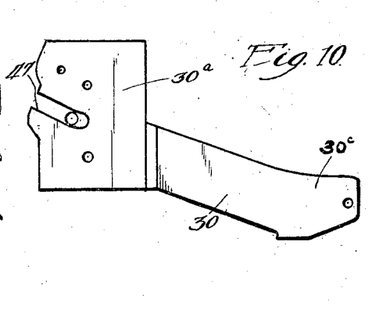
Fig. 10 shows a reduced side elevation of the side frame of the stoker with a part of the driving mechanism removed.

The stoker mechanism is supported in part by the side frame 30 and in part by the center frame 33 which comprises an upper portion 33$^a$, a central portion 33$^b$, and a lower part 33$^c$, which parts are secured together to form a rigid construction. The lower part 33$^c$ is seated upon the foundation 15, as illustrated in Fig. 3, and the upper parts 33$^a$ and 33$^b$ are supported on a pillar 34, which extends downwardly to the foundation of the stroker. The side frames and the center frame 33 have mounted thereon a series of transverse I-beams 35 which extend across the furnace and form supports for a series of longitudinally extending skids or hollow bars 37 which are spaced apart transversely of the grate and arranged to carry a series of caps or stationary grate bars 38 of hollow construction which are provided with a plurality of horizontally directed openings 39, as shown in Fig. 9, to permit the passage of air therethrough, the openings 39 being formed between a series of steps 39$^a$ which prevent particles of fuel from dropping through the grate bars as they pass downwardly toward the bridge wall. The skids 37 are provided adjacent the upper part of the grate and through the greater part of the length of the grate with laterally extending flanges 37$^a$ which form supports for the grate chains 40. These grate chains rest upon the flanges 37$^a$, and project slightly above the stationary grate bars 38, as illustrated in Figs. 5 and 6.

The grate chains 40 are each composed of four parallel series of links 41 which overlap and are connected together by pivot pins 42, the construction being adapted to permit the independent adjustment of the length of any chain, as more fully shown and described in my copending application, Serial No. 299,661, filed May 24, 1919. The links of the two inner series in each chain are cut away on their inner sides to form recesses 41$^a$, which are adapted to permit the pivot pins of the chains or bushings mounted thereon, to be engaged by the sprocket wheels upon which the chains are mounted and by which they are actuated. At the upper end of the grate, the chains 40 extend around sprocket wheels 44 which are mounted upon a shaft 45 extending transversely of the furnace and journalled in bearings 46 carried by the side frame. These bearings 46 are mounted in slots 47 formed in the side frame members and are connected to adjusting rods 48 which threadedly engage the plates 49 at the forward ends of the side frames and are secured in adjusted position by the lock nuts 50. These rods may be regulated in order to adjust the positions of the bearings 46 for the purpose of regulating the tensions of the chains 40 as a group. A similar bearing 51 is supported upon the center frame 33, and the position of this bearing may be regulated by sliding it on the center frame through the operation of a centrally located adjusting rod 48 which is also secured in position by a lock nut 50. At the lower end of the grate, the chains 40 are mounted upon other sprocket wheels 53 which are mounted on a shaft 54 journalled in the bearings 55 carried by the upturned ends of the lower parts 33 and 33$^c$ of the side frame and center frame, respectively. The lower stretches of the chains are supported on tubular rollers 56 which are mounted on transverse rods 57 supported by the side frames and the center frame, and the upper stretches of the chains, as previously described, are supported by the flanges 37$^a$ of the skids 37 throughout the upper part of the grate.

The flanges 37$^a$ terminate adjacent the lower end of the central parts 30$^b$ of the side frames, and from the lower ends of the flanges onwardly to the lower end of the grate, the chains 40 are supported on rollers 60, mounted on the transverse operating rods 64 of rectangular cross-section which, at intervals, are provided with cylindrical bushings 64ª journalled in bearings formed in the downwardly extending plates 65. The plates 65 are cast integrally with the skids 37 from the point where the flanges 37ª terminate to the lower end of the grate, and these plates seat upon the lower transverse I-beam 35 by which the grate bars are supported. The bell crank levers 61, 62 and 63 are adapted to elevate the chains through the medium of the contacting rollers 60. Three of these levers are arranged in series under each chain and are connected together so that when they are tilted about the shafts 64 they effect an elevation of the links of the chain, the range of which depends upon the length of the arms of the levers. The intermediate levers 62 are preferably longer than the levers 61 and 63, and the rods 64 by which all of these levers are actuated are formed in two series, one series of rods extending from one side frame to the center frame, and the other series of rods extending from the other side frame to the center frame, so that the rollers 60 in half of the furnace may be actuated independently of the rollers 60 in the other half of the furnace. The operation of the levers of each group is effected by means of crank arms 66, each of which is secured to one of the rods 64 at one end and to a transverse rod 66ª at its other end. Each transverse rod 66ª is pivotally connected to a longitudinal connecting rod 67. The levers and their connecting rod for each group of rollers are operated by a rod 68 which extends in a forward direction and is carried between the return stretches of two of the chains where it is pivotally attached to the middle point of an operating lever 69. One end of this lever is pivoted at 70 on the adjusting rod 71, and the other end of the lever is pivoted at 72 to the arm 73ª of an eccentric strap 73 which is adapted to extend around upon an eccentric 74 carried by the shaft 75. There are two eccentrics 75 and two sets of corresponding connected mechanism, one set being provided for each half of the furnace or for each section of the furnace where more than one center frame is used, and these eccentrics are operated simultaneously although preferably not in phase with each other by the rotation of the shaft 75 which is journalled in bearings 76 carried by the side frame and by the center frame. This shaft extends through one of the side frames and carries a pulley 76ª which is adapted to be driven by a belt 77, so that the operation of the eccentrics takes place continually and independently of the operation of the grate chains. It will be seen that with each operation of each eccentric, the rod is actuated to oscillate the levers 61, 62 and 63 and thereby elevate the lower portions of the chains above the grate bars or lower them below the grate bars. The adjusting rod 71, previously described, is slidably mounted on brackets 79 carried by the upper I-beam 35, and this rod is connected at its upper end to a rack bar 80 which is passed through a slot in the front wall 31 of the furnace. This ratchet bar 80 is adapted to engage a gear 81 which is pivoted on a bracket 82 and operated by a lever 83. The rack bar 80 and the connecting rods 71 are normally held in fixed position by a pin 84 which engages the registering apertures in the rack bar and in the bracket 82. When it is desired, this pin may be removed in order to change the position of the pivotal point 70 in order to vary the throw of the rod 60 upon each rotation of the connected eccentrics 74. In this way the agitation of the fuel and the degree of retardation thereof in any part of the furnace may be regulated independently by varying the movements of the levers by which the groups of rollers 60 are carried. It will be noticed also that the side frames and center frame as well as the grate bars and chain supports are curved upwardly toward the lower end of the grate so that the movement of the fuel is retarded and the thickness of the fuel bed increased adjacent the bridge wall.

Figure 1:
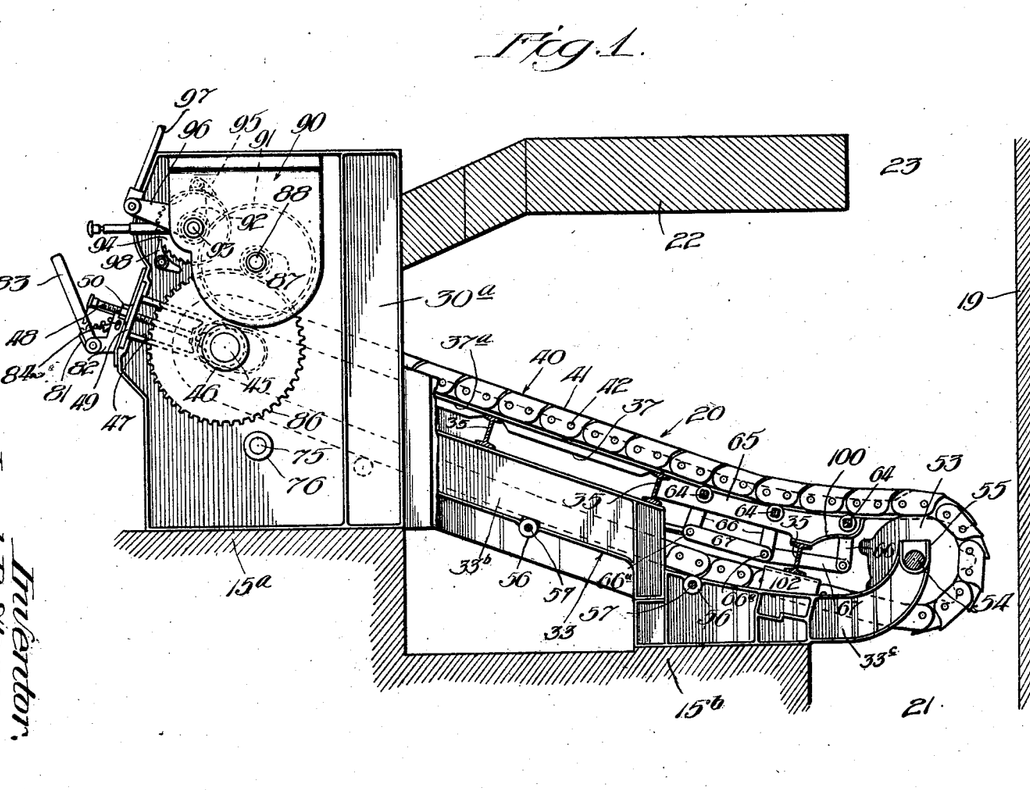
Figure 1 shows a side elevation of the stoker with the fire-brick side wall of the furnace removed.
Figure 2:
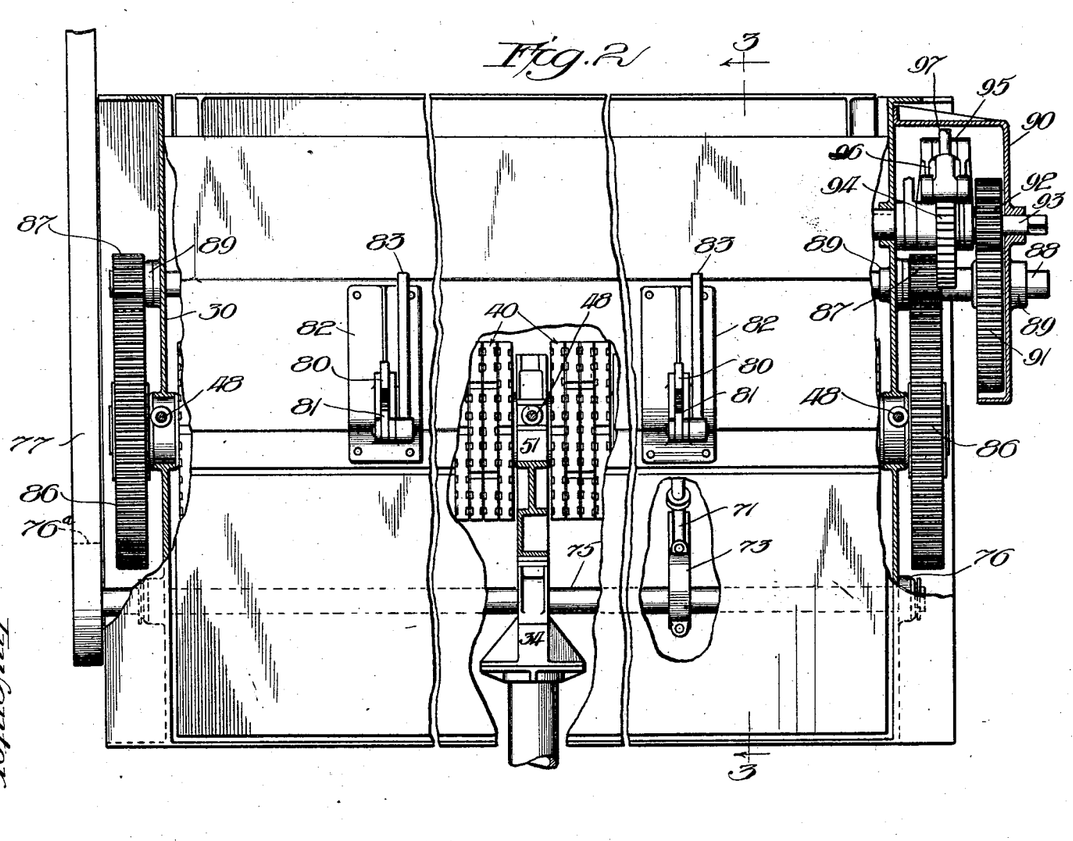
Fig. 2 shows an end elevation of the stoker with parts thereof broken away to illustrate the interior construction.
Figure 4:
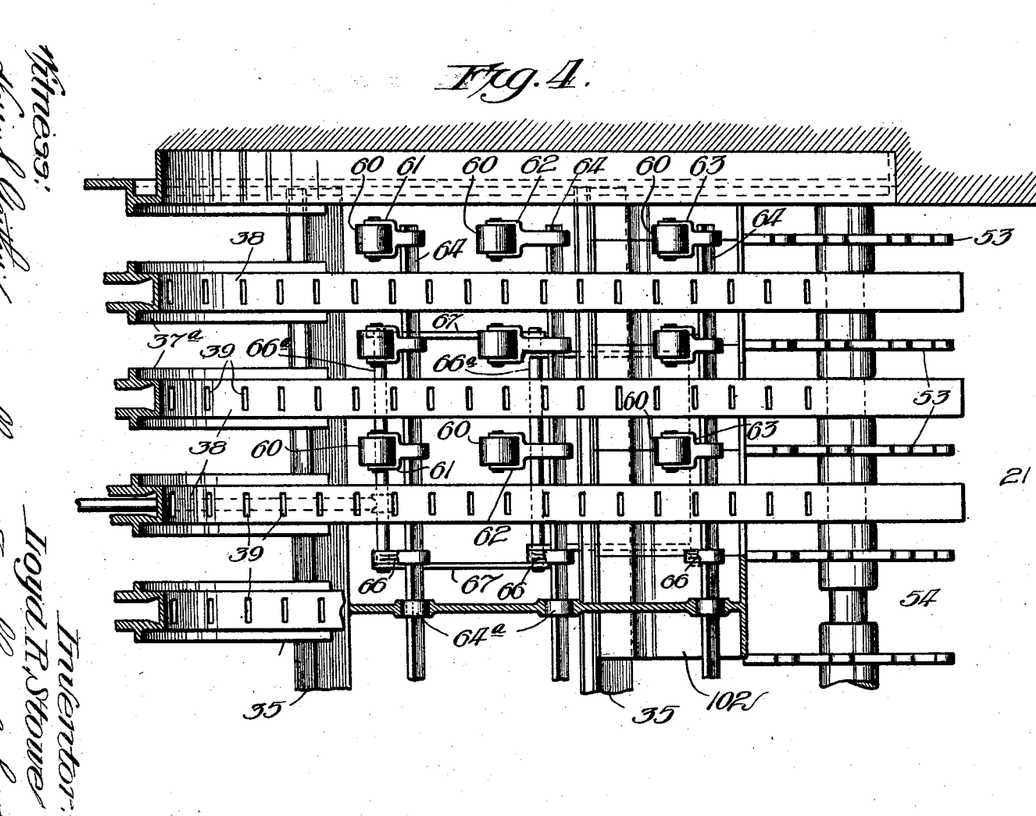
Fig. 4 shows a partial top plan view of the grate bars and the means for effecting a reciprocating movement of the chains, the chains being removed.

The grate chains are actuated independently of the means by which the chains are projected above or depressed below the grate bars, and this independent drive of the grate chains is effected through gears 86 which are secured to the projecting ends of the shaft 55. The gears 86 at opposite ends of the shaft are driven by pinions 87 which are secured to a shaft 88 which is mounted in bearings 89 carried by the side frames and by a bracket or housing 90 which is secured to the upper part of one of the side frames, as illustrated in Figs. 1 and 2. The shaft 88 has a gear 91 secured thereto within the housing 90, and this gear is driven by a pinion 92 located on another shaft 93 which in turn is journalled in bearings carried by the housing and the adjacent side frame 30. The shaft 93 has a ratchet wheel 94 fixed thereon, and this ratchet wheel is driven by a pawl 95 pivotally mounted on a lever 96. The other arm of the lever 96 is connected to a rod 97 which may be reciprocated by any desired mechanism in order to effect the actuation of the ratchet wheel. Reverse rotation of the ratchet wheel is prevented by the gravity actuated pawl 98 which is pivoted on the side frame adjacent the underside of the ratchet wheel.

Figure 8:
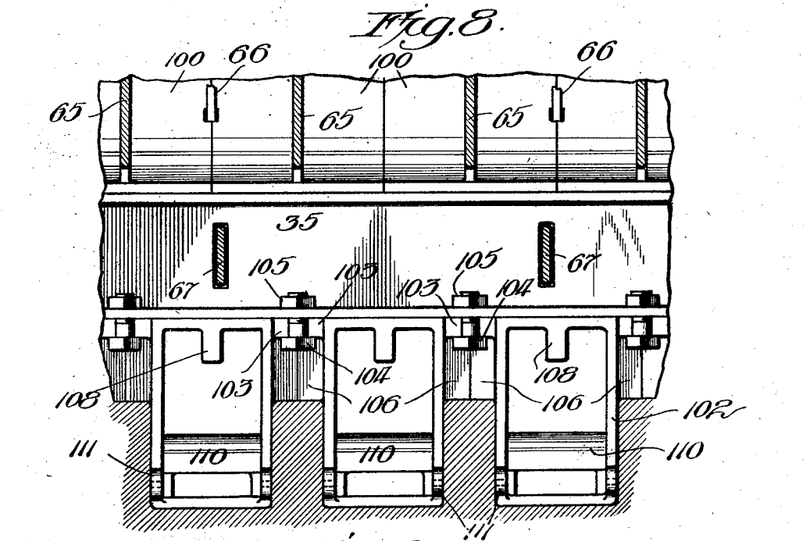
Fig. 8 shows a substantially vertical sectional view on the line 8—8 of Fig. 3, links being omitted for clearness.

At the lower end of the grate, the flow of air from the chamber 16 into the ash pit, or around the lower end of the grate, is prevented by an air seal. Above the lower stretches of the chains, this air seal comprises the transverse I-beam 35 which is secured to the undersides of the depending flanges 65 carried by the skids 37. The flow of air between the flanges 65 above the I-beam is prevented by a series of transverse flanges 100 which are cast integrally with the ends of the flanges 65 and projected transversely thereto, so that the flanges carried by one of the skids meet the flanges carried by the adjacent skids, thereby forming a closed wall entirely across the furnace in the space between the lower I-beam 35 and the upper stretches of the chains. The flow of air through the lower stretches of the chains is prevented by a series of air seal members 102 which are seated on the transverse pillar $15^d$ of concrete which extends upwardly from the foundation. These air seal members 103 are spaced apart distances which correspond to the distances between the adjacent chains 40 and are partially embedded in the concrete, as illustrated for example in Fig. 8. The upper sides of these air seal members seat against the I-beam 35 which is slotted to receive the connecting rods 67, and the members 102 are provided with transverse flanges 103 along their lateral edges, which flanges are overlapped by the heads of the bolts 104 which engage the flanges of the I-beam and are secured thereto by nuts 105. A series of vertical flanges 106 extend outwardly from the sides of the members 102 and are carried downwardly a sufficient distance from the I-beam 35 to close the spaces between the I-beam and the pillar $15^d$ and between the lateral edges of the members 102, as shown in Fig. 8. The upper walls of the members 102 are provided with depending lugs or flanges 108 which enter the notches $41^a$ formed in the links 41 of the chain. The lower surfaces of the chains are adapted to slide upon the air seal shoes 110 which are mounted in the lower parts of the members 102 and permitted preferably to rest therein by gravity, although they may be secured by wooden or metal pins passed through the holes in the ears 111 at the forward ends of the members 102, these pins being of such construction that they will shear off readily in case of accident or in case of sticking of the chains.

In the operation of the stoker, the fuel passes from the hopper 26 onto the upper end of the grate and is there supported partially by the grate bars 38 and partially by the moving chains 40. Since the chains 40 project above the stationary grate bars in the upper part of the grate, they are adapted to have a positive action in feeding the fuel over the stationary grate bars, although these bars will have some retarding effect which is adapted to effect an agitation of the fuel and to prevent the formation of cakes or clinkers in the upper grate area. In the lower part of the grate, the chains are supported entirely by the rollers 60 and these rollers are oscillated intermittently by the operation of the eccentrics 74, so that the chains alternately are projected above the grate bars and depressed below them. When they are projected above the grate bars, they serve to agitate the fuel and to feed it rearwardly, and when depressed below the grate bars they cause the feeding of the fuel to cease, so that a retardation thereof is effected and the building up of the fuel bed adjacent the discharge end of the grate is brought about by the operation of the chains as well as by the decreased inclination of the grate. The pivotal point 70 normally remains fixed so that with a given adjustment of this pivotal point, the action of the rollers 60 remains uniform. However, if a greater amount of retarding influence is desired, the pin 84 may be withdrawn and the lever 83 operated outwardly to move the rack bar 80 and the rod 71. This movement of the pivotal point 70 changes the arc of oscillation of the rollers 60 and allows them to exert a greater influence on the fuel. By adjusting the lever 83, the retarding influence may be regulated to any desired degree or substantially eliminated. The link mechanism for undulating the chains has a further advantage, since if the fuel bed becomes clogged or if the clinkers stick to the bridge-wall or to the stationary grate bars and it is desired to eliminate this undesirable condition, the pin 84 can be withdrawn and with the eccentric continuing to operate, the lever 83 can be quickly manipulated back and forth, thus allowing the moving chains above the roller 60 to operate as shaking bars which agitate the fuel and allow sufficient air to pass through it to burn down quickly any part of the fuel bed which has become unduly thickened.

Although I have shown and described one embodiment of the invention for purposes of illustration, it will be understood that it may be constructed in various other forms without departing from the scope of the appended claims.

What I claim is:

1. In combination, a series of stationary grate bars spaced apart, a series of grate chains each interposed between two of said grate bars, and means carried by said grate bars for supporting said chains and giving them an undulating motion with respect to the plane of said grate bars.

2. In combination, a series of stationary grate bars spaced apart, a series of grate chains each interposed between two of said grate bars, a series of rollers adapted to support the upper stretches of said chains, and means for moving said rollers to change the position of the upper surfaces of said chains with respect to the upper surfaces of said grate bars.

3. In combination, a series of grate bars spaced apart, a series of grate chains each interposed between two of said grate bars, stationary means carried by said grate bars for supporting said chains in one section of the grate, and movable means carried by said grate bars for supporting said chains in another section of the grate.

4. In combination, a series of grate chains spaced apart, a series of skids each having flanges adapted to support said chains throughout a part of the length of the grate, grate bars mounted between said chains, rollers mounted between one end of said grate and the ends of said flanges for supporting said chains throughout the remaining portion of the length of said grate, and means for actuating said rollers to change the elevation of the upper surfaces of said chains with respect to the upper surfaces of said grate bars.

5. In combination, a series of grate chains spaced apart, a series of skids each having flanges adapted to support said chains throughout a part of the length of the grate, grate bars mounted between said chains, rollers mounted between one end of said grate and the ends of said flanges for supporting said chains throughout the remaining portion of the length of said grate, and means for intermittently oscillating said rollers to carry them above or depress them below the upper surfaces of said grate bars.

6. In combination, a series of grate chains mounted on an incline and spaced apart, a series of grate bars each interposed between two of said chains, stationary supporting elements engaging the under sides of said chains in the upper part of the grate, and movable supporting elements engaging the under sides of said chains in the lower part of the grate.

7. In combination, a series of grate chains mounted on an incline and spaced apart, a series of grate bars each interposed between two of said chains, a series of inclined supporting skids extending throughout the upper portion of the grate and supporting the upper stretches of said chains, a series of movable supporting elements for supporting the upper stretches of said chains in the lower part of said grate, means for actuating said movable supporting elements to change the elevation thereof with respect to the upper surfaces of said grate bars, and means for moving said chains longitudinally of the grate.

8. In combination, a series of grate chains mounted on an incline and spaced apart, a series of grate bars each interposed between two of said chains, a series of inclined supporting skids extending throughout the upper portion of the grate and supporting the upper stretches of said chains, a series of movable supporting elements for supporting the upper stretches of said chains in the lower part of said grate, means for continuously actuating said movable supporting elements to effect a continuous variation in the elevation of the upper surfaces of said chains with respect to the upper surfaces of said grate bars, and manually controlled means for varying the degree of elevation of said chains by the operation of said last-named means.

9. In combination, a series of grate chains, a series of supporting elements engaging the under sides of said chains, means for moving said supporting elements to vary the elevation of said chains, and means for effecting an independent regulation of said last-named means in different portions of the area of the grate.

10. In combination, a series of grate bars spaced apart, a series of grate chains each interposed between two of said grate bars, supporting elements engaging the under sides of said chains, means for continuously actuating said supporting elements to change the elevation of said chains with respect to the upper surfaces of said grate bars, and means for effecting an independent regulation of said last-named means in different portions of the area of the grate.

11. In combination, a grate chain, a series of rollers mounted beneath and supporting said chain, a series of levers of different lengths each carrying one of said rollers, and means for oscillating said levers to vary the elevation of said chains.

12. In combination, a grate chain, a series of rollers mounted beneath and supporting said chain, a series of levers of different lengths each carrying one of said rollers, means connecting said levers, a driving shaft, an eccentric mounted on said shaft, and means connecting said eccentric with said levers.

13. In combination, a grate chain, a series of rollers mounted beneath and supporting said chain, a series of levers of different lengths each carrying one of said rollers, means connecting said levers, a driving shaft, an eccentric mounted on said shaft, an eccentric strap mounted on said eccentric, an actuating lever pivotally connected at one end to said eccentric strap, a regulating member pivotally connected to the other end of said actuating lever, and an actuating rod pivotally connected to said actuating lever and operatively attached to said first-named levers.

14. In combination, a grate chain, a series of rollers mounted beneath and supporting said chain, a series of levers of different lengths each carrying one of said rollers, means connecting said levers, a driving shaft, an eccentric mounted on said shaft, an eccentric strap mounted on said eccentric, an actuating lever pivotally connected at one end to said eccentric strap, a regulating member pivotally connected to the other end of said actuating lever, an actuating rod pivotally connected to said actuating lever and operatively attached to said first-named levers, and means for varying the position of said regulating member to vary the throw of said first-named levers.

15. In combination, a grate chain, a series of rollers mounted beneath and supporting said chain, a series of levers of different lengths each carrying one of said rollers, means connecting said levers, a driving shaft, an eccentric mounted on said shaft, an eccentric strap mounted on said eccentric, an actuating lever pivotally connected at one end to said eccentric strap, a regulating member pivotally connected to the other end of said actuating lever, an actuating rod pivotally connected to said actuating lever and operatively attached to said first-named levers, a rack bar connected to said regulating member, a gear engaging said rack bar, and an operating lever attached to said gear.

16. In combination, a pair of side frames, a center frame mounted between said side frames and extending downwardly to the foundation of the stoker, transverse frame members mounted on said side frames and said center frame, longitudinal skids mounted on said transverse frame members, a series of flexible grate chains having their upper stretches mounted on said skids, stationary grate bars carried by said skids and each grate bar being located between two of said chains, and means for independently elevating the chains on opposite sides of said center frame above said stationary grate bars.

17. The combination in a stoker, of a pair of side frames, a center frame located between said side frames and extending downwardly to the foundation of the stoker, transverse frame members carried by said side frames and said center frame, a series of skids carried by said transverse frame members, said skids being spaced apart and provided with laterally extending flanges terminating short of one end of the stoker, a series of grate chains adapted to be supported on said flanges throughout a portion of the length of the stoker supporting members extending from said skids, and a series of rollers supported by said members and adapted to support said chains throughout the remainder of the length of the stoker.

18. The combination in a stoker, of a pair of side frames, a center frame located between said side frames and extending downwardly to the foundation of the stoker, transverse frame members carried by said side frames and said center frame, a series of skids carried by said transverse frame members, said skids being spaced apart and provided with laterally extending flanges terminating short of one end of the stoker, a series of grate chains supported on said flanges throughout a portion of the length of the stoker supporting members extending from said skids, a series of transverse rods journalled in said members between said flanges and the other end of the stoker, a series of levers secured to said rods and extending therefrom longitudinally of said chains, rollers carried by said levers and engaging said chains, and means for oscillating said rods.

19. The combination in a stoker, of a pair of side frames, a center frame located between said side frames and extending downwardly to the foundation of the stoker, transverse frame members carried by said side frames and said center frame, a series of skids carried by said transverse frame members, said skids being spaced apart and provided with laterally extending flanges terminating short of one end of the stoker, a series of grate chains supported on said flanges throughout a portion of the length of the stoker supporting members extending from said skids, a series of transverse rods journalled in said members between said flanges and the other end of the stoker, a series of levers secured to said rods and extending therefrom longitudinally of said chains, rollers carried by said levers and engaging said chains, said transverse rods on one side of said center frame being independent of those on the other side of said center frame, and means for independently oscillating the rods on opposite sides of said center frame to actuate said levers and thereby change the elevation of the upper surfaces of said chains.

20. In combination, a series of grate bars spaced apart, a series of flexible chains mounted between said grate bars, a series of skids supporting said grate bars and having parts engaging the under sides of the upper stretches of said chains, supporting members extending from said skids at the rear of the grate, a transverse frame member supporting said supporting members adjacent the rear end of the grate, said supporting members being provided at their rear ends above said frame member with transverse flanges closing the spaces between said supporting members, and air seal members mounted beneath said transverse frame member for closing the air spaces around the lower stretches of said chains.

21. The combination in a stoker, of a pair of side frames, a center frame mounted between said side frames and extending downwardly to the foundation of the stoker, transverse frame members mounted on said side frames and said center frame, longitudinal supporting members mounted on said transverse frame members, a series of flexible grate chains having their upper runs mounted on said supporting members, stationary apertured grate bars carried by said supporting members and located each between two of said chains.

22. The combination in a stoker, of a pair of side frames, a plurality of grate chains spaced apart, shafts extending transversely between said side frames, sprockets mounted on said shafts and coacting with said chains, stationary grate bars each mounted between two of said chains, a plurality of supports each mounted between the upper and lower runs of one of said chains and supporting said chains and grate bars, transverse beams extending between said side frames and supporting said supports, and a center frame located beneath one of said grate bars and extending upwardly between two of said chains to provide an auxiliary support for said supports and transverse beams.

In testimony whereof, I have subscribed my name.

LOYD R. STOWE.